(12) United States Patent
Yi

(10) Patent No.: US 6,754,330 B1
(45) Date of Patent: Jun. 22, 2004

(54) METHOD FOR SCREENING SIGNALING MESSAGE IN NO. 7 SIGNALING NETWORK

(75) Inventor: Seung-Hee Yi, Kyoungki-Do (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 09/697,077

(22) Filed: Oct. 27, 2000

(30) Foreign Application Priority Data

Oct. 28, 1999 (KR) ........................................ 1999-47298

(51) Int. Cl.[7] ............................................. H04M 7/00
(52) U.S. Cl. .................................. 379/230; 379/221.08
(58) Field of Search ........................... 379/230, 221.08, 379/221.1, 221.03, 194, 195, 196, 197, 207.2; 370/401, 469

(56) References Cited

U.S. PATENT DOCUMENTS

| | | | | |
|---|---|---|---|---|
| 5,282,244 A | * | 1/1994 | Fuller et al. | 379/230 |
| 5,862,334 A | * | 1/1999 | Schwartz et al. | 709/223 |
| 5,953,404 A | * | 9/1999 | Fikis et al. | 379/230 |
| 6,167,129 A | * | 12/2000 | Fikis et al. | 379/230 |
| 6,639,981 B1 | * | 10/2003 | Dunn, Jr. et al. | 379/221.13 |

OTHER PUBLICATIONS

Jabbari, B., "Routing and Congestion Control in Common Channel Signaling System No. 7", Proceedings of the IEEE, vol. 80, Issue 4, pp. 607–617, Apr. 1992.*

"ITU–T Q.700: Introduction to CCITT Signalling System No. 7," International Telecommunication Union, Mar. 1993.*

* cited by examiner

Primary Examiner—Harry S. Hong
(74) Attorney, Agent, or Firm—Fleshner & Kim, LLP

(57) ABSTRACT

A method for screening a signaling message in a No. 7 signaling network is disclosed. Transmission of a signaling message to be abandoned is prevented and the amount of loads of the signaling network is thereby reduced by transmitting screening information to the originating signaling point of the corresponding signaling message with respect to the signaling message to be abandoned at the gateway signaling point during signaling message screening. In addition, at the originating signaling point of the corresponding signaling message, the system can determine why a normal signal routing could not be achieved by analyzing the signaling message screening information and notifying the network manager of the same. Proper action to correct this problem can then be taken.

27 Claims, 4 Drawing Sheets

METHOD FOR SCREENING SIGNALING MESSAGE IN NO. 7 SIGNALING NETWORK

BACKGROUND OF THE INVENTION

1. Field of the Invention

The present invention relates to a communications network, and more particularly, to a method for screening a signaling message in a No. 7 signaling network.

2. Background of the Related Art

The ITU-T signaling system No. 7 is typically used as a signaling system between exchanges in a mobile communication network. Such a signaling system No. 7 includes a signaling message screening function. This function prevents an unfriendly or unexpected signaling message from being introduced into a local signaling network of a service provider, and is generally carried out at a gateway signaling point when the above signaling network is interlocked with a signaling network of another service provider.

The signaling message screening function of the signaling system No. 7 will be described according to an example of the construction of the signaling system No. 7 illustrated in FIG. 1. Referring to FIG. 1, supposing that signaling points A, B, and C belong to a service provider X, and that signaling points D, E, and F belong to a service provider Y. Further, assume that a signaling message is transmitted from signaling point A to signaling point F, and that the signaling message screening function is carried out at signaling points D and E of the service provider Y. Finally, assume that signaling link sets in the signaling network are all available.

A signaling message generated from signaling point A is routed to adjacent signaling points, specifically signaling point B or C, in order to be transmitted to signaling point F. After receiving the message, the adjacent signaling point carries out a signaling message discrimination function. This is done at A message discrimination unit with respect to the signaling message received from the signaling network. Since the destination point of the signaling message is not the signaling point having received this signaling message, a routing process is carried out in order to transmit the signaling message to the final destination signaling point. This is done by transmitting the same to a message routing unit, whereby the signaling message is received from a gateway signaling point of the service provider Y, that is, the signaling point D or E.

In Message Transfer Part (MTP) level 3 of the gateway signaling point that received the signaling message, a routing or distribution is carried out by analyzing (discriminating) the received signaling message. This will be described with reference to FIG. 2.

As shown in FIG. 2, the message discrimination unit 1 identifies the final destination of the signal message by analyzing the message received from a signal link of MTP level 3. It then transmits the received message to a message screening unit 2.

In a disabled state of the signaling message screening function, the message screening unit 2 preferably performs one of two possible tasks after receiving the above signaling message. First, if the final destination identified by the message discrimination unit 1 is non-local, the message screening unit 2 transmits the signaling message to a message routing unit 4 for routing the same to a signal route connected to an adjacent signaling point. This is done to transmit the signaling message to the final destination. If the identified final destination is local, on the other hand, the message screening unit 2 transmits the signaling message to the message distribution unit 3, which transmits the same to a local user part (level 4).

In an enabled state of the signaling message screening function, the message screening unit 2 carries out screening of the above signaling message.

Where the received signaling message has passed through the screening function, if the final destination identified by the message discrimination unit 1 is non-local, the signaling message is transmitted to the message routing unit 4 for routing the signaling message to a signal route connected to an adjacent signaling point. This is done to transmit the signaling message to the final destination. If, however, the identified final destination is local, the signaling message is transmitted to the message distribution unit 3, which transmits the signaling message to a local user part (level 4).

Where the received signaling message has not passed through the screening function, the corresponding signaling message is determined to be non-transmittable and is abandoned, and a signaling network management unit (MTP level 3) of a local signaling point is notified of the abandonment of this signaling message.

In the case that the signaling message received by the signaling message screening function is abandoned at a gateway signaling point, the local signaling network management unit recognizes that this signaling message has been abandoned. This information, however, cannot be recognized by the originating point of the signaling message.

Thus, in a signaling network as shown in FIG. 1, when the signaling message is abandoned at the signaling point D or E by the signaling message screening function, the signaling point (D or E) recognizes that the signaling message is abandoned. A signaling point of other service provider network (X), and originating point A, however, cannot recognize this fact. Hence, the originating signaling point A continuously sends the signaling message.

This causes the amount of loads of the signaling network to be increased during traffic transfer due to the signaling message abandoned by the signaling message screening function. Because the originating point cannot know the reason thereof, it is difficult to take proper action to correct this problem.

The above references are incorporated by reference herein where appropriate for appropriate teachings of additional or alternative details, features and/or technical background.

An object of the present invention is to provide a method for screening a signaling message in a No. 7 signaling network that overcomes the limitations and disadvantages caused by problems with the related art.

It is a another object of the present invention to provide a method for screening a signaling message in a No. 7 signaling network which is capable of preventing transmission of a signaling message abandoned by the signaling message screening function at a gateway signaling point by notifying an originating signaling point of the screening information on the signaling message.

To achieve at least these objects in whole or in parts, there is provided a method for screening a signaling message in a No. 7 signaling network, which includes a first step of generating a MSI (MTP Screening Information) message containing the screening information on a signaling message to be abandoned during signaling message screening and transmitting the same to an originating signaling point; and a second step of preventing transmitting of the signaling message to be abandoned using the screening information contained in the MSI message.

To achieve at least these objects in whole or in parts, there is provided another method for screening a signaling message in a No. 7 signaling network, which includes a first step of generating a Message Transfer Part (MTP) Screening Information (MSI) message containing the screening information for a non-transmittable signaling message during a signaling message screening function, a second step of transmitting the MSI message to an originating signaling point, and a third step of preventing the transmission of the signaling message to be abandoned by using the screening information included in the MSI message.

To achieve at least these objects in whole or in parts, there is provided another method for screening a signaling message at a gateway signaling point in a No. 7 signaling network, which includes a first step of screening a signaling message inputted into a local station, and a second step of transmitting screening information to an originating point of a signaling message determined to be non-transmittable during the screening.

To achieve at least these objects in whole or in parts, there is provided another method for screening a signaling process at an originating signaling point in a No. 7 signaling network, which includes a first step of receiving a prescribed message having screening information among signaling messages inputted from other signaling points, a second step of storing the screening information in memory, a third step of determining whether a signaling message is transmittable, referring to the stored screening information, and a fourth step of preventing transmitting of the signaling message to be abandoned.

To achieve at least these objects in whole or in parts, there is provided a message discrimination system of a No. 7 signaling network, which includes an analyzer circuit to receive a signaling message and determine if the signaling message is a message screening information (MSI) message, a memory coupled to the analyzer circuit to receive and store the signaling message determined to be a MSI signaling message, and an output circuit coupled to transmit a state of the memory to a signaling network manager.

To achieve at least these objects in whole or in parts, there is provided a signaling message screening information message for a No. 7 signaling network, which includes a point code, a service information octet, a screening cause, a heading label, and a routing label, wherein the message screening information message prevents transmission by an originating signaling point of a signaling message to be abandoned, and wherein the heading label comprises first and second heading codes that allocate and use unused values among the values defined in recommendation ITU-T, Q.70x.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In order to provide a signaling message screening function in a No. 7 signaling network according to a preferred embodiment of the present invention, a MTP signaling message screening information (MSI) message must be newly defined. The basic format of the MSI message conforms to the recommendation (ITU-T, Q.70x). The main parameters contained in the MSI message are as follows in Table 1.

TABLE 1

| Spare (00) | Point Code | Service Information Octet | Screening Cause | Heading Code H1 | Heading Code H0 | Routing Label |
|---|---|---|---|---|---|---|
| 2-bit | 14-bit | 8-bit | 8-bit | 4-bit | 4-bit | 32-bit |

In Table 1, the routing label consists of a Destination Point Code, Originating Point Code, and the Signaling Link Selection (SLS) Code, and the structure thereof is as follows in Table 2.

TABLE 2

| SLS | Originating Point Code | Destination Point Code |
|---|---|---|
| 4-bit | 14-bit | 14-bit |

In addition, in Table 1, the Point Code indicates the signaling point information of a corresponding message, when the screening cause is related to signaling points such as an originating point (or a destination point), for example. The Service Information Octet (SIO) indicates the SIO information of the corresponding message, when the screening cause is a SIO screen. The SIO defined in the standard consists of a Network Indicator (NI) (2-bits), Spare (2-bits), and a Service Indicator (4-bits), each of which is as follows in Table 3 and Table 4.

TABLE 3

| | ♦ NI (network indicator) | | |
|---|---|---|---|
| bits | D | C | |
| | 0 | 0 | International network |
| | 0 | 1 | Spare (for international users only) |
| | 1 | 0 | National network |
| | 1 | 1 | Reserved for national use |

TABLE 4

| bits | D | C | B | A | ♦ service indicator |
|---|---|---|---|---|---|
| | 0 | 0 | 0 | 0 | Signaling network management messages |
| | 0 | 0 | 0 | 1 | Signaling network testing and maintenance messages |
| | 0 | 0 | 1 | 0 | Spare |
| | 0 | 0 | 1 | 1 | SCCP |
| | 0 | 1 | 0 | 0 | Telephone User part |
| | 0 | 1 | 0 | 1 | ISDN User Part |
| | 0 | 1 | 1 | 0 | Data User Part (call and circuit-related messages) |
| | 0 | 1 | 1 | 1 | Data User part (facially registration and cancellation messages) |
| | 1 | 0 | 0 | 0 | Reserved for MTP Testing User Part |
| | 1 | 0 | 0 | 1 | Broadband ISDN User Part |
| | 1 | 0 | 1 | 0 | Satellite ISDN User Part |
| | 1 | 0 | 1 | 1 | Spare |
| | 1 | 1 | 0 | 0 | Spare |
| | 1 | 1 | 0 | 1 | Spare |
| | 1 | 1 | 1 | 0 | Spare |
| | 1 | 1 | 1 | 1 | Spare |

In addition, the Heading Codes H0 and H1 newly allocate unused values among the values defined in the recommendation and use the same. Finally, the Screening Cause indicates the reason why the corresponding signaling message is screened, which includes the types as described in Table 5.

TABLE 5

| Bits (8) | Cause |
|---|---|
| 00000000 | Originating point code screening |
| 00000001 | Destination point code screening |
| 00000010 | Service information octet screening |
| ... | ... |

Figure 1:
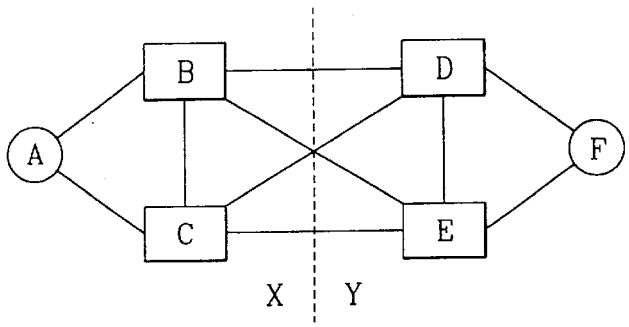
FIG. 1 is a block diagram illustrating an example of the structure of a related art No. 7 signaling network.
Figure 2:
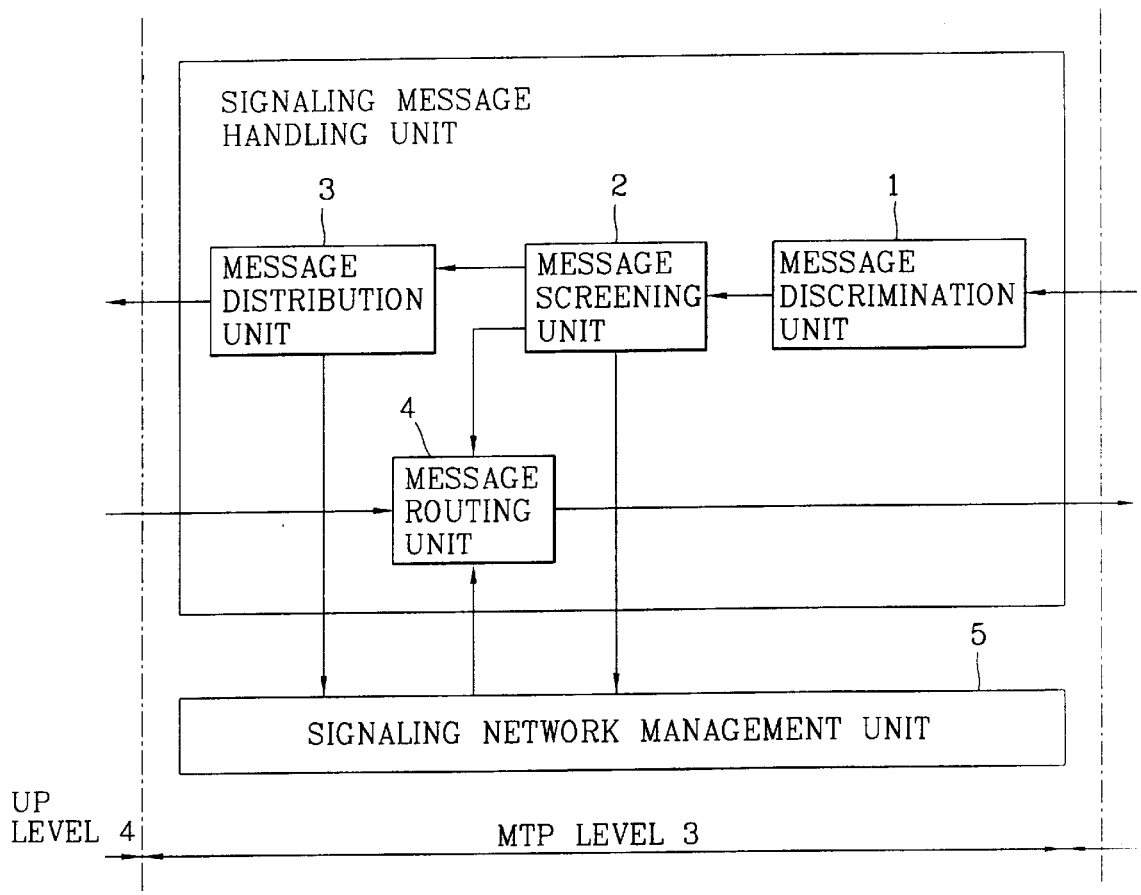
FIG. 2 is a block diagram illustrating components used to carry out signaling message screening at MTP level 3 in a related art No. 7 signaling network.

A process of screening a signaling message at each point using the above newly defined MSI message will be described with reference to FIGS. 3 and 4, and the structure of this signaling network will be described according to the embodiment of the structure as illustrated in FIG. 1.

Initially, when a message is transmitted from a signaling point (for example, A) to an adjacent signaling point (B or C), in order that a signaling point A of a service provider X can transmit the signaling message to another signaling point (for example, F), of another service provider (for example, Y), a gateway signaling point (D or E) of the service provider Y screens the signaling message introduced into the service provider Y.

Figure 3:
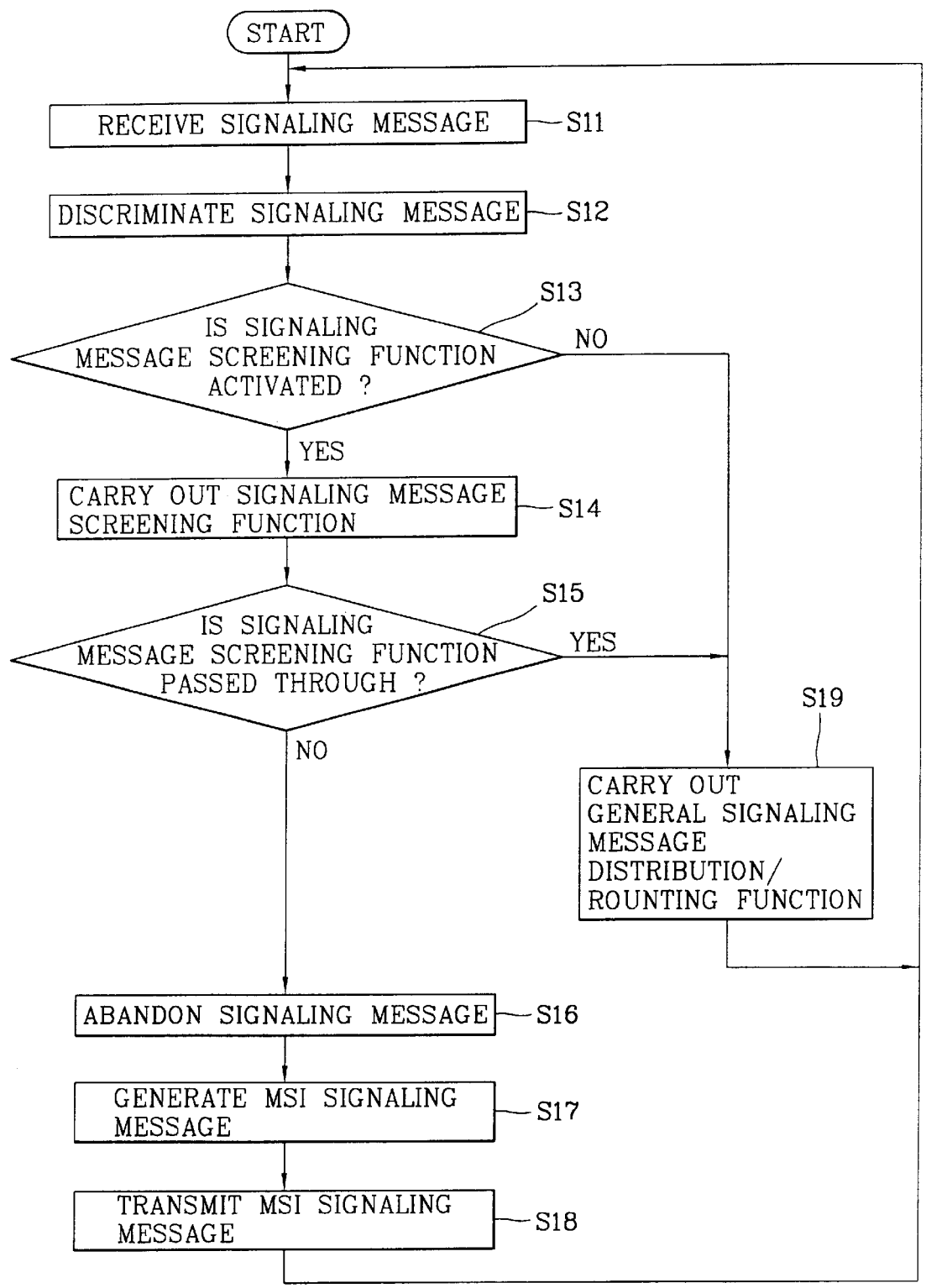
FIG. 3 is a flow chart illustrating a process of screening a signaling message or a gateway signaling point in a No. 7 signaling network according to a preferred embodiment of the present invention.
Figure 4:
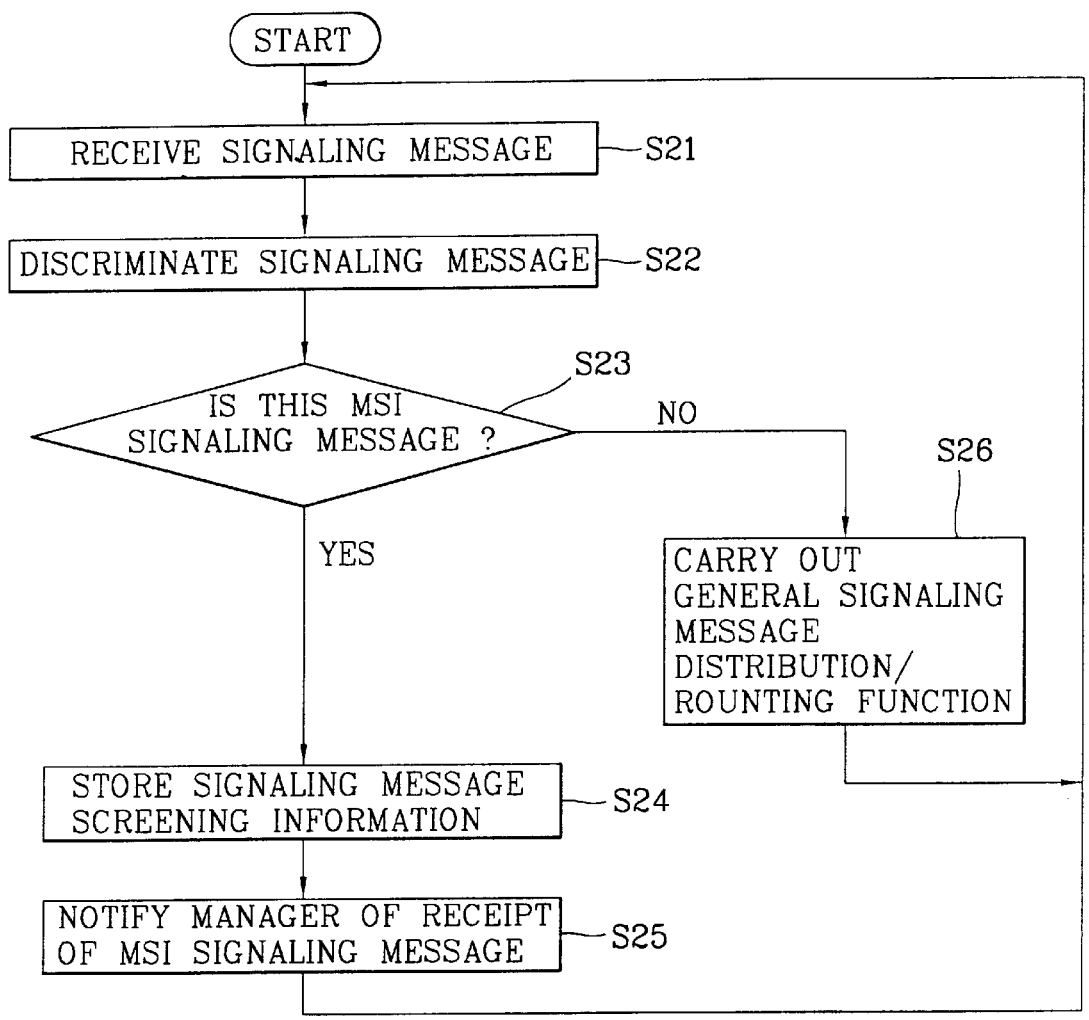
FIG. 4 is a flow chart illustrating the process of screening a signaling message at an originating point in the No. 7 signaling network according to a preferred embodiment of the present invention.

FIG. 3 is a flow chart illustrating the procedure of processing a signaling message at the gateway signaling point D or E. Referring to FIG. 3, the signaling message is initially received, as shown in Step S11. The gateway signaling point D or E carries out discrimination of the signaling message in Step S12, and thereafter transmits the received signaling message to the message screening unit. It then determines whether or not the message screening function is activated, as shown in Step S13.

As the result of the determination, if the signaling message screening function is disabled, a general signaling message distribution/routing function is carried out, as shown in Step S19, and then the routine returns to Step S11 for receiving a new signaling message.

On the other hand, if as the result of the determination in Step S13, the signaling message screening function is enabled, the signaling message screening function is accordingly carried out, as shown in Step S14.

Then, in Step S15, it is determined whether the received signaling message has passed through all signaling message screening functions. If the received signaling message has passed through all signaling message screening functions, a general signaling message distribution/routing function is carried out in Step S19. Thereafter the routine returns to Step S11 to receive a new signaling message. If, however, the signaling message has not passed through all signaling message screening functions, the signaling message is abandoned, as shown in Step S16.

Then, a MSI signaling message is generated using screening information of the abandoned signaling message in Step S17. The MSI signaling message is written in the format as described in Table 1.

Thereafter, the written MSI message is transmitted to the originating point A of the corresponding signaling message, as show in Step S18, and the routine returns to Step S11, and waits to receive a new message.

In this manner, when the MSI signaling message containing the screening information on the signaling message abandoned by the signaling message screening function of the gateway signaling point is transmitted to the originating signaling point A, the originating signaling point A carries out the procedure of processing the MSI signaling message. This procedure will now be described with reference to FIG. 4.

First, if a certain signaling message is received, as shown in Step S21, the originating signaling point A analyzes the received signaling message and determines whether the received signaling message is a MSI signaling message, as shown in Step S23.

As the result of the determination, if the received signaling message is not a MSI signaling message, a general signaling message distribution/routing function is carried out, as shown in Step S26, and the routine returns to Step S21 for receiving a new signaling message.

Meanwhile, as the result of the determination in Step S23, if the received signaling message is a MSI signaling message, the signaling message screening information contained in the MSI signaling message is stored in a prescribed memory region or database system, as shown in Step S24. A signaling network manager is notified of this fact, as shown in Step S25, and the routine then returns to Step S21, to receive a new signaling message. Thus, the originating signaling point A is notified if the memory contains the MSI signaling message.

Figure 5:
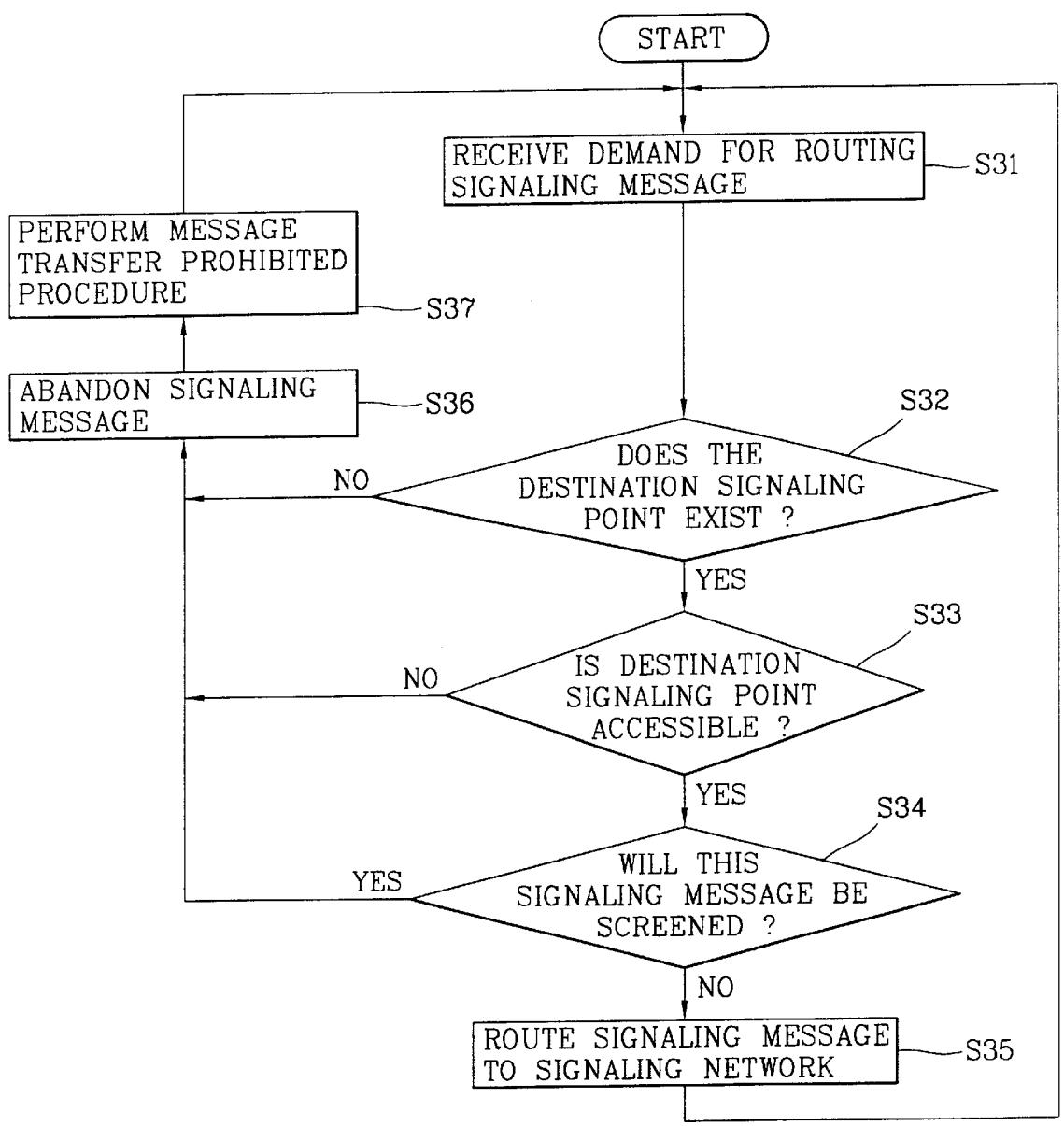
FIG. 5 is a flow chart illustrating a process of transmitting a signaling message at the originating point in the No. 7 signaling network according to a preferred embodiment of the present invention.

Afterwards, when the originating signaling point A is about to transmit a certain signaling message through the signaling network, as illustrated in FIG. 5, transmission of the signaling message to be abandoned by the screening function is prevented, referring to the built signaling message screening information. This procedure will now be described with reference to FIG. 5.

Referring to FIG. 5, if a routing demand for a certain message is received, as shown in Step S31, it is determined whether a destination signaling point exists in the signaling message, as shown in Step S32. As the result of the determination, if the destination signaling point exists, it is determined whether or not the corresponding destination signaling point is accessible, as shown in Step S33.

Then, if the destination signaling point is accessible, it is determined whether or not the corresponding signaling message is screened, as shown in Step S34, on the basis of the MSI information built in Step S24.

If the signaling message has not been screened, a general signaling message routing process is carried out, as shown in Step S35. If it is determined that the corresponding signaling message has been screened, the signaling message is abandoned, as shown in Step S36, and the procedure of preventing transmission of the corresponding signaling message is carried out, as shown in Step S37.

Meanwhile, if there is no destination signaling point as determined in Steps S32 or S33, or if the corresponding destination signaling point is not accessible, the steps for abandoning the corresponding message and preventing transmitting of the same are carried out, as shown in Steps S36 and S37.

As described herein, the method for screening a signaling message in a NO. 7 signaling network has several advantages. For example, transmission of the signaling message to be abandoned is prevented and the amount of loads of the signaling network can thus be reduced. Also, screening information is transmitted to the originating signaling point of the corresponding signaling message with respect to the signaling message to be abandoned at the gateway signaling point during signaling message screening function.

In addition, the originating signaling point of the corresponding signaling message can determine why a normal signal routing could not be achieved by analyzing the signaling message screening information. The network manager can then be notified of the same. Thus, it is possible to take appropriate action to correct this problem.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for screening a signaling message in a No. 7 signaling network, comprising:
   generating a Message Transfer Part (MTP) Screening Information (MSI) message including screening information for a signaling message to be abandoned during a signaling message screening function;
   transmitting the MSI message to an originating signaling point; and
   preventing transmission of the signaling message to be abandoned by using the screening information included in the MSI message.

2. The method of claim 1, wherein a format of the MSI message comprises a point code, a service information octet, a screening cause, at least one heading code, and a routing label.

3. The method of claim 2, wherein the point code comprises information representing the corresponding signaling point, when the screening cause of the corresponding signaling message is related to a prescribed signaling point.

4. The method of claim 2, wherein the service information octet comprises information representing a type of a corresponding network and message, when the screening cause of the corresponding signaling message is related to a type of a network and a message.

5. The method of claim 2, wherein the heading code allocates unused values among predefined values and uses the allocated values.

6. The method of claim 5, wherein the predefined values are defined in recommendation ITU-T, Q.70x for No. 7 signaling networks.

7. The method of claim 1, wherein generating the MSI message comprises:
   receiving a signaling message from an originating signaling point;
   screening the signaling message;
   determining whether the signaling message has passed through the screening process; and
   generating the MSI message of a signaling message that has not passed through the screening process.

8. The method of claim 1, wherein preventing transmission of the signaling message comprises:
   receiving the MSI message from a gateway signing point;
   storing the screening information of the received MSI message;
   notifying a network manager that the MSI message is received;
   determining whether a certain signaling message is transmittable, based on the stored screening information; and
   preventing transmission of the non-transmittable sign message to be abandoned.

9. The method of claim 1, wherein the non-transmittable signaling message will be abandoned by the network.

10. A method for screening a signaling message at a gateway signaling point in a No. 7 signaling network, comprising:
    screening a signaling message inputted into a local station; and
    transmitting screening information to an originating point of a signaling message determined to be non-transmittable during the screening to prevent transmission of the signaling message by the originating point.

11. The method of claim 10, wherein the screening information is formatted in a prescribed message format before being transmitted.

12. The method of claim 11, wherein the prescribed message format comprises a point code, a service information octet, a screening cause, a heading code, and a routing label.

13. The method of claim 12, wherein the point code comprises information representing the corresponding signaling point when the screening cause of a corresponding signaling message is related to a prescribed signaling point.

14. The method of claim 12, wherein the service information octet comprises information representing the type of the corresponding network and message when the screening cause of the corresponding signaling message is related to a type of a network and a message.

15. The method of claim 12, wherein the heading code re-allocates unused values among values defined in recommendation ITU-T, Q.70x and uses the re-allocated values.

16. The method of claim 12, wherein the heading code comprises a first heading code and a second heading code.

17. A method for screening a signaling process at an originating signaling point in a No. 7 signaling network, comprising:
    receiving a prescribed message having screening information among signaling messages inputted from other signaling points;
    storing the screen information in memory;
    determining whether a signaling message is transmittable, referring to the stored screening information; and preventing transmitting of the signaling message if it is determined not to be transmittable.

18. The method of claim 17, wherein the prescribed message has a prescribed format, comprising a point code, a service information octet, a screening cause, a heading code, and a routing label.

19. The method of claim 18, wherein the point code comprises information representing the corresponding signaling point when the screening cause of the corresponding signaling message is related to a prescribed signaling point.

20. The method of claim 18, wherein the service information octet comprises information representing the type of the corresponding network and message when the screening cause of the corresponding signaling message is related to a type of a network and a message.

21. The method of claim 18, wherein the heading code newly allocates unused values among values defined in recommendation ITU-T, Q.70x and uses the same.

22. A message discrimination system of a No. 7 signaling network, comprising:
 an analyzer circuit to receive a signaling message and determine if the signaling message is a message screening information (MSI) message;
 a memory coupled to the analyzer circuit to receive and store the signaling message determined to be a MSI signaling message; and
 an output circuit coupled to transmit a state of the memory to a signaling network manager.

23. The system of claim 22, wherein the output circuit notifies an originating signal point if the memory contains MSI signaling messages and prevents a transmission of non-transmittable signaling messages according to the MSI signaling messages.

24. The system of claim 22, wherein the analyzer circuit receives the signaling message from a gateway signaling point.

25. The system of claim 22, wherein the signaling message originates at an originating signaling point, and is screened by a screening circuit.

26. The system of claim 25, wherein an MSI message is generated for signaling messages that do not pass through the screening circuit.

27. A signaling message screening information message for a No. 7 signaling network, comprising:
 a point code;
 a service information octet;
 a screening cause;
 a heading label; and
 a routing label wherein the message screening information message is provided to a first signaling point from a second signaling point and prevents transmission by the first signaling point of a signaling message to be abandoned by the second signaling point, and wherein the heading label comprises first and second heading codes that allocate and use unused values among the values defined in recommendation ITU-T, Q.70x.

* * * * *